Figure 1:
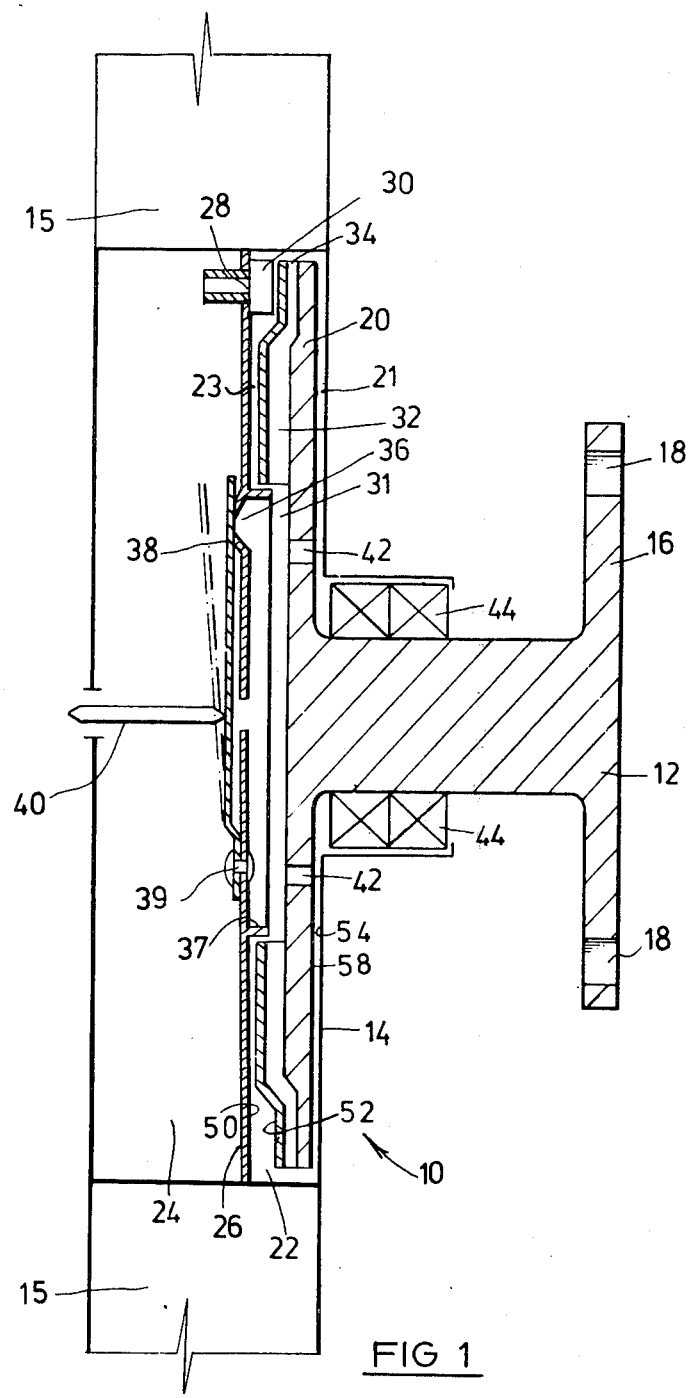

United States Patent [19]
Hall

[11] 3,907,084
[45] Sept. 23, 1975

[54] FLUID COUPLING
[75] Inventor: Jeffrey Hall, Huddersfield, England
[73] Assignee: Holset Engineering Company Limited, Huddersfield, England
[22] Filed: Feb. 11, 1974
[21] Appl. No.: 441,214

[30] Foreign Application Priority Data
Feb. 14, 1973 United Kingdom.............. 7168/73

[52] U.S. Cl............................ 192/58 B; 192/82 T
[51] Int. Cl.² ................................. F16D 35/00
[58] Field of Search............. 192/58 B, 82 T, 58 C

[56] References Cited
UNITED STATES PATENTS

| | | | |
|---|---|---|---|
| 2,792,095 | 5/1957 | Sherman ........................ | 192/58 B |
| 3,007,560 | 11/1961 | Weir.............................. | 192/58 B |
| 3,055,473 | 9/1962 | Oldberg et al. ................ | 192/82 T |
| 3,444,748 | 5/1969 | Sutaruk ........................ | 192/58 B X |
| 3,463,282 | 8/1969 | Fujita et al..................... | 192/58 B |
| 3,575,269 | 4/1971 | Sherman ....................... | 192/58 B |

Primary Examiner—Allan D. Herrmann
Attorney, Agent, or Firm—Diller, Brown, Ramik & Wight

[57] ABSTRACT

The present invention provides a fluid coupling containing a working fluid and comprising a rotatable driving member, at least part of which is mounted for co-axial rotation within a working chamber forming part of a rotatable driven member. Shear spaces are defined by opposing faces of said driving member and working chamber and a reservoir forms part of the driven member. One or more inlet ports are provided adjacent the periphery of the driven member and connecting the working chamber with the reservoir and one or more outlet ports are located radially inwardly of the inlet port or ports. A fluid transfer duct means extends axially between the outlet port or ports and one or more flow accelerating passages within that part of the driving member located within the working chamber. Each fluid flow accelerating passage is open at each end and extends from a location immediately radially outwardly of the outlet port or ports to the periphery of the driving member. The periphery of the driving member is located at a greater radial distance from the co-axial centres of the driving and driven members than the inlet port, and a valve member is movable to open or close the outlet port or ports and control the flow of fluid from the reservoir to the shear spaces via the said transfer duct and fluid flow accelerating passages.

11 Claims, 2 Drawing Figures

US Patent  Sept. 23, 1975  3,907,084

FLUID COUPLING

The present invention relates to fluid couplings, e.g. fluid couplings for fan drives.

Fluid couplings normally comprise a driving member and a driven member mounted for rotation relative to each other with at least a part of one of said members (usually the driving member) mounted within a housing containing a viscous liquid and formed by at least a part of the other of said members. In operation rotation of the driving member is transmitted to the driven member by the shear created between the members due to the viscous liquid. In such systems it is desirable that the degree of drive transmitted is capable of variation with respect to a controlling parameter, that the response of the driven member to changes in the controlling parameter is rapid and that the action of the coupling is smooth.

According to the present invention there is provided a fluid coupling containing a working fluid and comprising a rotatable driving member, at least part of which is mounted for co-axial rotation within a working chamber forming part of a rotatable driven member, shear spaces defined by opposing faces of said driving member and working chamber, a reservoir forming part of the driven member, at least one inlet port adjacent the periphery of the driven member and connecting the working chamber with the reservoir, at least one outlet port located radially inwardly of the inlet port or ports, fluid transfer duct means extending axially between the outlet port or ports and one or more flow accelerating passages within that part of the driving member located within the working chamber, each said fluid flow accelerating passage being open at each end and extending from a point immediately radially outwardly of the outlet port or ports to the periphery of the driving member, the periphery of the driving member being at a greater radial distance from the co-axial centres of the driving and driven members than said inlet port, a valve member movable to open or close the outlet port or ports and control the flow of fluid from the reservoir to the shear spaces via the said transfer duct and fluid flow accelerating passages.

Preferably the fluid transfer duct means is formed as an integral part of the driven member, In one embodiment the fluid transfer duct means comprises an axially directed annular flange integral with the driven member and positioned radially outwardly of the outlet port or ports. In one preferred embodiment the central portion of the driving member is dished and each fluid transfer duct means extends into said dished portion.

The valve member is normally controlled in response to a parameter which varies with the degree of drive required from the coupling e.g. in the case of a fan located immediately behind a radiator in an automobile cooling system the controlling parameter is preferably the temperature of air leaving the radiator.

The flow accelerating passage or passages may be in the form of an annular space extending from a region near the centre of the driving member to one or more (preferably a series) of orifices at the periphery of the driving member or may be in the form of one or more small individual passageways.

Means e.g. a "scoop", is normally provided such that when the driving member is rotated a flow of fluid from the working chamber into the reservoir is created.

In operation of the invention when the outlet is open fluid flows from the working chamber through the inlet port or ports to the reservoir, through the outlet port or ports to the fluid transfer duct means and from the transfer duct means through the accelerating passage or passages to the periphery of the working chamber. When the outlet is closed fluid cannot re-enter the working chamber. The amount of fluid within the working chamber thus decreases and the amount of drive transmitted to the driven member is consequently reduced. The arrangement of the present invention is such that the shear spaces between the opposed faces of the driving and driven members are filled from the periphery thus reducing the possibility of an air lock forming in the area of the periphery and also reducing the possibility of incomplete filling of the shear space at the back of the rotor.

Furthermore, a smooth and rapid response of the drive to an opening of the outlet port e.g. in response to an increase in temperature of air leaving a radiator of an automobile is obtained.

The rapid response is achieved by transferring the working fluid that initially flows from the outlet port to flow accelerating passages within the driving member. As the driving member is always rotating at higher speed than the driven member a greater rate of flow of the fluid entering the working chamber is possible. By suitable sizing of the inlet port or ports this rate of flow can be made greater than the rate of flow of fluid from the working chamber. The difference between the rate of flow into and out of the working chamber provides an excess of fluid in the working chamber that fills the shear spaces from the periphery inwardly. As the drive between the opposing faces of a shear type coupling is proportional to the fourth power of the radius it can be seen that filling the shear spaces from the periphery at the maximum radius will result in the greatest possible acceleration of the driven member and hence the most rapid increase in the rate of flow from the reservoir and the most rapid reduction in the rate of flow from the working chamber.

A further advantage that is achieved by this method of operation is that the size of the inlet port or ports may be relatively large thus ensuring the rapid emptying of the shear spaces when the outlet port is closed.

The fluid fills the shear spaces from the periphery of the working chamber and is always filling into a reducing volume thereby ensuring smoothness of filling without any intermediate degree of filling which occurs in arrangements where filling takes place from the centre rather than from the periphery.

Figure 2:
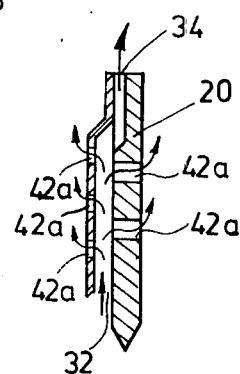

The invention will now be described by way of example with reference to the accompanying drawings, in which:

FIG. 1 is a section through a fluid coupling in accordance with one embodiment of the present invention, and forming part of a fan drive, and FIG. 2 is a section through part of a modified arrangement in accordance with the present invention.

Referring now to FIG. 1 a fluid coupling indicated generally as 10 containing a working fluid (not shown) comprises a driving member 12 and a driven member 14 adapted to carry a fan or fan blades 15. The driving member 12 includes a flange 16 for connection via bolt holes 18 with a source of rotational energy not shown. Drive disc 20 which forms part of the driving member 12 is enclosed within working chamber 22 forming part of the driven member 14 and defining shear spaces 21, 23 wall surfaces 50, 54 and 52, 58 on the working chamber 22 and driving member 12, respectively. The working chamber 22 is separated from a reservoir 24 also forming part of the driven member 14 by a wall 26. An inlet port 28 is provided adjacent the periphery of the drive disc 20 and the inlet port 28 is provided with a scoop 30. The central portion of the drive disc 20 is dished at 31 and a series of flow accelerating passages 32 formed in the drive disc 20 extend from the dished central region 31 of the drive disc 20 to the periphery of the drive disc 20. The flow accelerating passages 32 terminate in orifices 34 formed in the peripheral edge of the drive disc 20. An outlet port 36 is provided in the wall 26. Fluid transfer duct means 37 is formed as an axial flange on wall 26 radially outwardly of outlet port 36 and extends into the dished central region 31 of the drive disc 20. A valve member 38 comprising a flexible metal strip attached to the wall 26 by a rivet 39 is provided to open and close the port 36. Movement of valve member 38 is controlled by a sensor 40 (diagrammatically illustrated) which senses the temperature externally of the fluid coupling. A viscous fluid is contained within the coupling and the distribution of the fluid between the working chamber 22 and the reservoir 24 is controlled by the degree of openings of port 36.

A series of pressure balance orifices 42 are formed in a central region of the drive disc 20. Bearings 44 are provided to allow relative rotation between the drive member 12 and the driven member 14, and accurately position the driven member 14 with respect to the driving member 12.

In operation the drive member 12 is rotated and by the shear resistance of the viscous fluid in the working chamber 22 the driven member 14 begins to rotate. By virtue of the difference in speed between the driving disc 20 and the driven member 14 viscous fluid is gathered by the scoop 30 and passes through the inlet port 28 to the reservoir 24. As long as the temperature externally of the coupling is above a predetermined limit the sensor 40 maintains the valve member 38 in a position in which the outlet port 36 is open. Fluid from the reservoir 24 therefore passes through the outlet port 36, and is guided by the fluid transfer duct means 37 into the flow accelerating passages 32, orifices 34 and into the working chamber 22. The shear spaces 21, 23 fill from the periphery and an equilibrium flow is achieved from the reservoir 24 through the transfer passages 32 into the working chamber 22 and back into the reservoir 24. When the temperature externally of the coupling drops below the predetermined limit the valve member 38 is moved by sensor 40 to close the outlet 36 thereby preventing flow of fluid from the reservoir 24 to the flow accelerating passages 32 and thus to the working chamber 22. The scoop 30 however continues to direct fluid from the working chamber 22 through the inlet port 28 into the reservoir 24 and the amount of fluid in the working chamber 22 is thereby reduced thus decreasing the amount of fluid in the shear spaces 21, 23 and hence the degree of drive between the drive disc 20 and the driven member 14. The driven member 14 begins to slow down until it is substantially free-wheeling round the drive disc 20 with very little drive being transmitted from this drive disc 20 to the driven member 14. When the temperature again rises above the predetermined limit the valve member 38 is moved by the sensor 40 to open the outlet port 36 thereby allowing fluid to pass from the reservoir 24 through the outlet port 38 and flow accelerating passages 32 into the working chamber 22. The amount of fluid in the working chamber is gradually increased from the periphery until the shear spaces 21, 23 are filled and equilibrium is again reached. During this time the speed of the driven member increases due to the increasing area of driving and driven member in shear.

Referring to FIG. 2 this shows a part of a drive disc 20 similar to that of FIG. 1 but modified by the inclusion of two series of supplementary orifices 42a establishing connection between the transfer passages 32 and the working chamber 22.

It will be appreciated that many modifications of the arrangements shown in the drawings are possible. For example more than one (e.g. two) inlet port 28 may be provided. If desired the fluid transfer duct means may comprise a small tube extending around the perimeter of outlet 36 in place of the flange 37.

I claim:

1. A fluid coupling containing a working fluid and comprising:
   a rotatable driving member;
   a rotatable driven member;
   a working chamber forming part of said rotatable driven member;
   means mounting at least part of said rotatable driving member for coaxial rotation within said working chamber;
   said driving member and working chamber having opposing faces defining shear spaces;
   a fluid reservoir forming part of said driven member;
   inlet port means adjacent the periphery of said driven member and connecting said working chamber to said reservoir;
   outlet port means located radially inwardly of said inlet port means and connecting said reservoir to said working chamber;
   flow accelerating passage means within said part of said driving member located within said working chamber,
   fluid transfer duct means extending axially between said outlet port means and said flow accelerating passage means;
   said fluid flow accelerating passage means being open at each end and extending from a location immediately radially outwardly of said fluid transfer duct means to the periphery of that part of said driving member disposed within said working chamber;
   the periphery of said part of said driving member being at a greater radial distance from the co-axial centers of the driving and driven members than said inlet port means; and
   valve means operable to selectively open and close said outlet port means and control the return flow of fluid from said reservoir to said shear spaces via said transfer duct means and fluid flow accelerating passage means.

2. A fluid coupling according to claim 1 in which said fluid transfer duct means is formed as an integral part of said driven member.

3. A fluid coupling according to claim 1 in which the central portion of said part of said driving member is dished and said fluid transfer duct means extends into said dished portion.

4. A fluid coupling according to claim 1 further comprising means controlling said valve means in response to a parameter which varies with the degree of drive required from the coupling.

5. A fluid coupling according to claim 1 in which said part of said driving member defines an inner annular space and said flow accelerating passage means is in the form of passages extending from said annular space to orifice means at the periphery of said part of the driving member.

6. A fluid coupling according to claim 1 in which said flow accelerating passage means is in the form of a plurality of small individual passageways.

7. A fluid coupling according to claim 1 further comprising a means arranged on said driven member such that, when said driving member is rotated, a flow of fluid from said working chamber into the reservoir is created.

8. A fluid coupling according to claim 1 further comprising at least one axially directed orifice means in said part of said driving member, said orifice means establishing fluid connection between said flow accelerating passage means and said working chamber.

9. A fluid coupling according to claim 1 further comprising at least one axially directed orifice means extending through said part of said driving member located within said working chamber and positioned radially inwardly of the radially inner end of said fluid flow accelerating passage means.

10. A fluid coupling according to claim 2 in which said fluid transfer duct means comprises an axially directed annular flange on said driven member, said flange being positioned radially outwardly of said outlet port means.

11. A fluid coupling according to claim 8 in which said means arranged on said driven member comprises a scoop located in the vicinity of said inlet means.

* * * * *